INVENTORS
FRANK R. ABBOTT
JAMES A. PEUGH

INVENTORS
FRANK R. ABBOTT
JAMES A. PEUGH
BY
ATTORNEYS

Sept. 20, 1966  F. R. ABBOTT ET AL  3,274,536
BROAD BAND MULTIPLE BEAM FORMING DEVICE
Filed Aug. 31, 1964  3 Sheets-Sheet 3

INVENTORS
FRANK R. ABBOTT
JAMES A. PEUGH
BY
ATTORNEYS

United States Patent Office 3,274,536
Patented Sept. 20, 1966

3,274,536
BROAD BAND MULTIPLE BEAM FORMING DEVICE
Frank R. Abbott and James A. Peugh, San Diego, Calif., assignors to the United States of America as represented by the Secretary of the Navy
Filed Aug. 31, 1964, Ser. No. 393,462
4 Claims. (Cl. 340—6)

The invention described herein may be manufactured and used by or for the Government of the United States of America for governmental purposes without the payment of any royalties thereon or therefor.

This invention relates to transducer arrays and to networks for so combining the individual transducer voltages as to increase the gain of the array in each of several discrete directions.

In U.S. Patent 3,002,188, entitled "Harmonic Wave Beam Steering System," issued on Sept. 26, 1961, to Frank R. Abbott, is disclosed a linear transducer array with unique phase compensation circuits for each transducer voltage for identifying the azimuthal direction of the signal. As described in the patent, the system is suitable for only a single or narrow band of signal frequencies. This is because the system presumes a definite phase difference of the wave as it passes different sensors of the array. In one version of the system, the phase difference is uniform and the phase at any sensor or transducer becomes $$\phi_n = n \cdot 2\pi/\lambda \cdot a \cdot \sin \theta \tag{1}$$

in which $\phi_n$ is the phase of the signal at the terminals of the $n$th sensor with respect to an arbitrarily designated reference sensor, $n$ is the number of the sensor from the reference position, while $\lambda$ is the wave length of the signal received, $a$ is the spacing between sensors and $\theta$ is the angle of incidents of the wave from the normal to the array. The beam forming compensator with outputs sensitive to $\phi_n$ cannot define an azimuth angle $\theta$ unless $\lambda$ is given.

The set of output terminal voltages of such a compensator are thus definitive of direction of waves having prescribed increments of phase, $\phi_n$, between sensors. If as is frequently the case the array of sensors are spaced to minimize multiple lobes, then the spacing at a highest working frequency is $\lambda/4$. If the phase compensator imposes $-\lambda/4$ correction per section, then the maximum compensator output is an arithmetic sum of the induced voltages or currents when a wave is received along a line parallel to the transducer array, or is "end fired." If, assume, the frequency is doubled so that the wavelength is halved, then a wave from only 30° off broadside would exhibit $\lambda/4$ incremental phase displacement per sensor and appear as a maximum at the same output terminals at the lower frequency signal from end fired azimuth. That is to say, it is proper to tabulate a unique set of frequencies and azimuthal angles for each pair of output terminals of a phase compensator.

It is accordingly an object of this invention to provide an improved beam forming device.

A more specific object of this invention is to provide a beam forming device capable of receiving a broad band of frequencies and resolving the frequencies into multiple identifiable beams.

According to this invention the horizon viewed from the array is divided into an equal number of segments, the number of segments being determined by directivity of the array and the degree of resolution desired. For each azimuth segment or "beam" a phase compensating network is provided. Each phase compensating network comprises means for combining the voltages at the terminals of each transducer. Two coupling circuits are provided at each transducer for coupling out two voltages which are, respectively, proportional to the sine and the cosine of the phase shift of the advancing wave front to be seen by the particular hydrophone relative to an arbitrary point in the array. If, as shown, the transducers are each inductively coupled into the system (capacitive or restive couplings may be employed) each transducer is connected to the primary winding of a transformer. For each phase compensating network two secondaries are provided, one secondary having a number of turns proportional to $A_n \sin \phi_n$ and the other secondary having a number of turns proportional to $A_n \cos \phi_n$ where $A_n$ is the shading factor for side lobe suppression for the $n$th hydrophone, $\phi$ is the phase shift to be seen by the $n$th hydrophone relative to an arbitrary point in the array. If now all of the "sine" voltages of the array are added, and all of the "cosine" voltages are added and one sum is shifted 90° with respect to each other, at a fixed frequency F, then the sum of the two phase shifted voltages will yield a maximum output for the frequency F on the selected beam. The output of such a phase compensator network is thus definitive of direction of waves having prescribed increments of phase, $\theta_n$, between sensors.

According to this invention a plurality of bandpass filters may be connected to each compensator pair of terminals to derive each of the frequencies which may appear at the terminals of the compensator in each of the desired directions.

Other objects and features of this invention will become apparent to those skilled in the art by referring to the specific embodiment described in the following specification and shown in the accompanying drawings in which.

Figure 1:
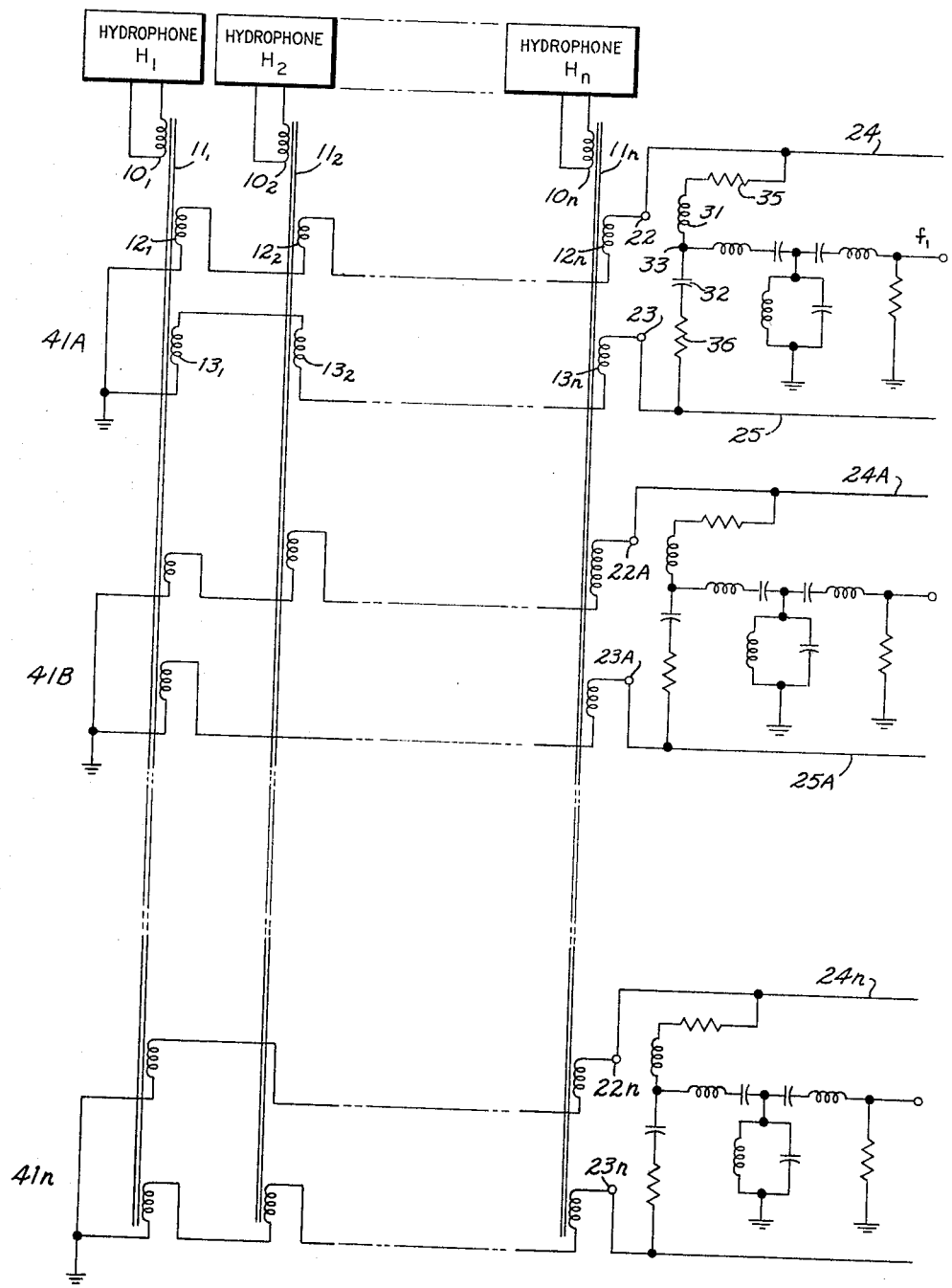
FIG. 1 is a schematic circuit diagram of $n$ hydrophones and their coupling circuits.

In FIG. 1 the desired number of hydrophones $n$ are indicated at $H_1$ to $H_n$. One embodiment found to be efficient comprised an array of 16 hydrophones. The terminals of each hydrophone are connected to primary windings (10 wound on core 11). In the low frequency spectrum considered here, from 50 to 500 cycles per second, the primary windings may each comprise 500 turns and have a resistance of about 500 ohms. If is contemplated that the hydrophones be arranged in a straight line and be uniformly spaced. On each core 11 is wound secondary windings $12_1$ to $12_n$, respectively. These windings will be termed hereinafter the "sine" components. Adjacent windings $12_1$–$12_n$ are secondary windings $13_1$ to $13_n$ which will be termed the "cosine" windings. The sine windings are connected in series and the cosine windings are connected in series and hence to output terminals 22 and 23, respectively.

The number of turns of the "sine" secondary windings for each of the hydrophones is determined by the expression $$QS_n = A_n \sin (K + \phi_n)$$

The number of turns on the cosine secondaries for the hydrophones is determined by the expression $$QC_n = A_n \cos (K + \phi_n)$$

where $A_n$ is the shading factor for the $n$th hydrophone, $\phi_n$ is the phase shift to be seen by the $n$th hydrophone relative to an arbitrary reference point in the array, and K is the phase between the arbitrary point and the first or nearest hydrophone. K is 45°, where the reference point is at the center of an even-numbered array.

It is apparent that if a wave arrives from a source at a point normal to the face of the array, where $\theta$ is 0, the transducer voltages are all in phase and the secondary windings for this azimuth are all the same. If, however, the array is end fired, where $\theta$ is 90°, the phase difference between the voltages at one end of the array is at a maximum with respect to the phase at the other end of the array.

Figure 2:
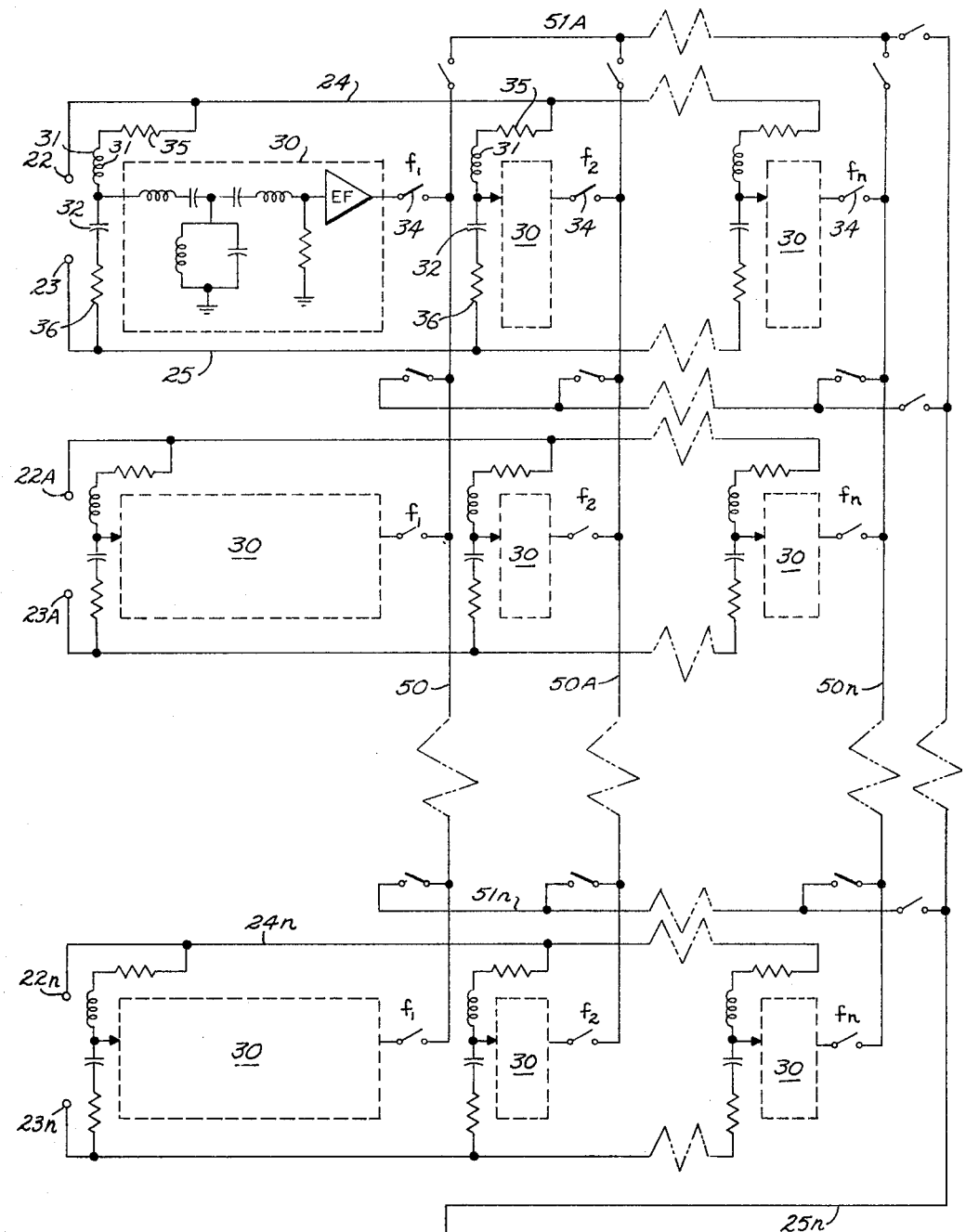
FIG. 2 is a schematic circuit diagram of the filters of the several phase compensator circuits.

According to this invention the several voltages of windings $12_1$–$12_n$ are serially added and applied to terminal 22, and the several voltages of the cosine windings $13_1$–$13_n$ are serially added and applied to terminal 23. The terminals 22 and 23 of phase compensating network 41A are connected respectively, to the bus bars 24 and 25. Likewise, the terminals 22N and 23N of phase compensating network 41N are connected to bus bars 24N and 25N. Connected between bus bars 24 and 25 are a large number of bandpass filters 30 tuned, respectively, to $f_1$, $f_2$, . . . $f_n$, as best seen in FIG. 2. The number of compensating networks 41A–41N correspond to the number of incremental azimuthal directions desired to be displayed by the system. Preferably the bandpass filter characteristics are shoulder-to-shoulder across the entire spectrum expected to be received by the array.

Next, the relative phases of the sine and cosine voltages on bus bars 24 and 25, are shifted 90° and then added. The phase shifters shown comprise inductance 31 connected between the bus bar 24 and the input of each of the series of filters 30, and condensers 32 connected between the bus bar 25 and the input of the filters. Alternative to a 45° phase shift between each bus and filter, the entire 90° phase shift could, if desired, be accomplished between one bus bar and the filters. In operation, the output terminals 34 of the several filters 30 contain, respectively, the frequencies $f_1$, $f_2$ . . . $f_n$ which may be received by the hydrophones on the beam defined by the phase compensating network.

Figure 3:
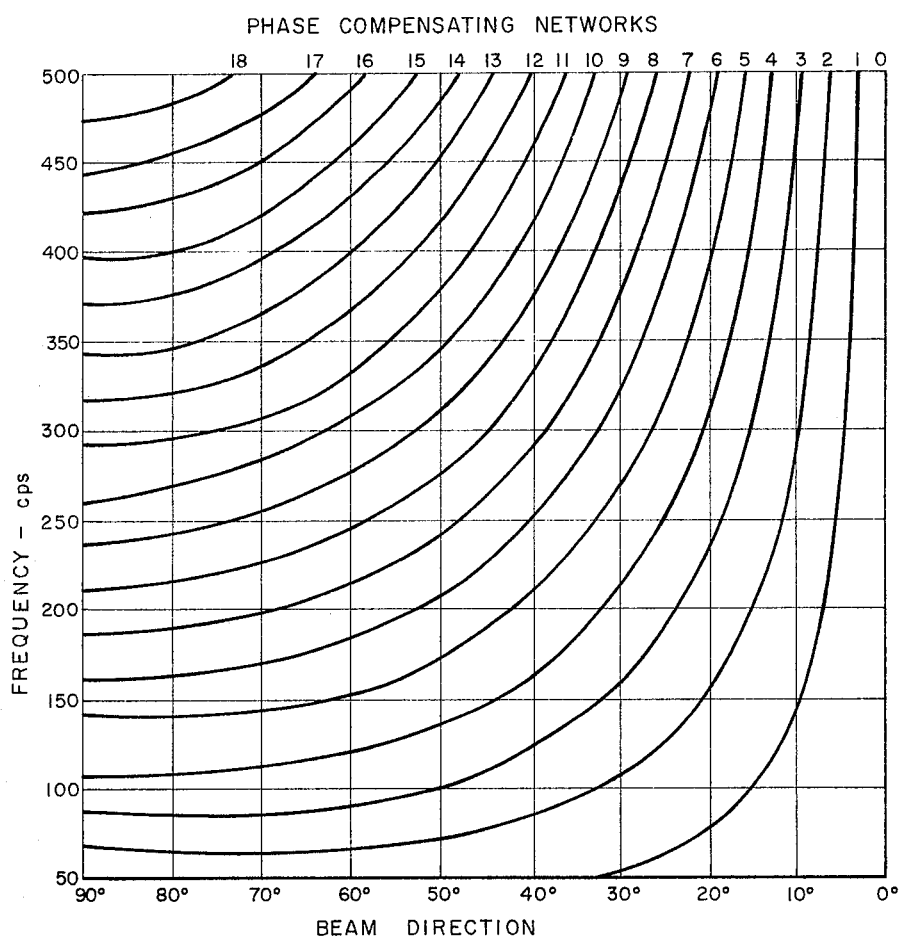
FIG. 3 is a beam direction-versus-frequency graph of the output terminals of FIGS. 1 and 2.

For each "beam" or different azimuth segment from the face of the array, a different phase compensating network, 41, is selected by consulting FIG. 3. In each, the number of turns of the sine windings and the cosine windings are each computed the particular phase angle $\phi$. Each pair of serially added voltages of each phase compensator network is applied, respectively, to a different pair of bus bars 24, 25—24N, 25N. Between each pair of bus bars are connected filters 30 which select, respectively, frequencies $f_1$, $f_2$ . . . $f_n$. That is, the system of FIGS. 1 and 2 is capable of identifying the frequency and direction of any signal received.

It will be noted that between the bus bars 24 and 25 are connected the resistance pads 35 and 36 to limit the loading effects caused by the fact that the phase compensating networks are not all feeding the same number of filters. Likewise resistor pads may be inserted between the filter outputs and the selection board circuitry. Or, if desired, emitter followers may be inserted at the output of each filter to isolate the filters.

According to another feature of this invention, the operator is enabled to readily connect the output of any filter of any beam to the display. For this purpose a cross bar switching arrangement may be employed, as shown. The vertical bus bars 50, 50a . . . 50n may be connected, respectively, to the outputs of filters of like frequencies. By means of simple toggle switches or pegboard pins any one of the frequencies $f_1$, for example, from the various azimuthal compensators may be connected to vertical bar 50. Horizontal bars 51a, 51b . . . 51n may be selectively connected to any one of the vertical bars. The right-hand end of the horizontal bars are connected enmasse or individually to the input of a display device 55 such as a cathode ray tube or oscilloscope. Isolation by emitter followers is preferred where the outputs of several filters are to be connected in parallel at the display. Hence, in operation, the operator can readily connect the output of any filter from any azimuth to the display. If his interest is in only one frequency he omits all but one connection. If he is concerned with all frequencies he may omit only those bearing sectors and the frequencies subject to strong interference of an identifiable or uninformative nature.

One phase compensator network may produce an acoustic beam broad enough to cause more than one of the desired azimuthal angles at a particular frequency. According to this invention this redundancy is employed to reduce the number of filters 30 required in the system. In FIG. 3 beam direction is plotted against a frequency. By using a filter only for the nearest beam-frequency combination a large number of filters can be omitted without effecting the bearing resolution. The curved lines of FIG. 3 show the frequency-bearing combinations of the system. The phase compensators are computed for uniform incremental phase shift. This gives equal crossover intensity levels for adjacent acoustic beams. By inspection of FIG. 3 it can be easily determined to which compensating network a filter output connection should be made to deliver a prescribed frequency for a prescribed bearing sector. It is apparent that a single filter will supply the necessary information for several sectors. The characteristics of FIG. 3 are plotted from an operating system comprising 16 hydrophones in linear array, the hydrophones being spaced six feet apart. The primary of each transformer has 600 turns and, where there were 39 phase compensating network (41), there were 78 secondary windings on each transformer which had from +10 to −10 turns.

The increase or decrease in number of turns, called the shading factor, $A_n$, for any hydrophone for reducing side lobes was computed from the expression $$A_n = 10 \cos (8 - n/7.7)$$

where $A_n$ indicates absolute value and $n$ is the number of the hydrophones from either end of the array. The shading is introduced on the secondary windings in this embodiment. The winding schedule for this system was designed as suggested above, so that the center point of the array would correspond to +45° phase shift. This is permissible although, in an even-numbered array, there is no hydrophone at the midpoint. This choice is completely arbitrary but is employed to produce symmetry and make winding schedule computations easier. While frequencies from 50 to 500 cycles per second have been mentioned it is clear that higher frequencies or even radio frequencies may be employed, if desired.

What is claimed is:
1. A beam steering system for an array of uniformly spaced transducers for transmitting or receiving all frequencies of a broad band of frequencies along a plurality of distinct directional beams, said system comprising:
   (1) a plurality of pairs of bus bars, the number of pairs of bus bars corresponding to the number of said beams,
   (2) first and second groups of impedance elements coupled, respectively, between the bus bars of each pair and each of said transducers for applying to said bus bars summations of transducer voltages, the impedance of each element being so chosen that the voltages applied by each transducer to the associated bus bar is a function of the sine and cosine, respectively, of the phase displacement of the associated transducer from a reference point in said array at one frequency in said band,
   (3) a plurality of bandpass filters coupled to each pair of bus bars, the passband of said filters being different segments of said broad band,
   (4) phase shifting and summing means connected between each pair of bus bars and associated filters for relatively shifting 90° the phase of one bus bar voltage with respect to the other at the center frequency of the associated passband, and
   (5) switch means for selectively displaying the output of selected filters.

2. A beam steering system for defining a plurality of differently aimed signal beams, said system comprising:
an array of uniformly spaced transducers,
means associated with each transducer for deriving a voltage proportional to sin $\phi_n$, where $\phi_n$ is the phase shift seen by the $n$th transducer relative to an arbitrary fixed point in said array,
means associated with each transducer for deriving a voltage proportional to cos $\phi_n$, where $\phi_n$ is the phase shift seen by the $n$th transducer relative to said arbitrary fixed point,
means for adding the derived sin voltages,
means for adding the derived cos voltages,
means for relatively shifting 90° the phase of the resultants of said voltages,
a plurality of filters capable of passing different discrete bands of frequencies coupled to said phase shifting means, and
means for selectively displaying the output voltages of said filters.

3. In combination in a broad band multiple beam forming device comprising:
an array of uniformly spaced transducers,
a plurality of transformers, each with a primary winding, the primary winding being coupled, respectively, to the terminals of said transducers, each transformer having a plurality of secondary windings,
a plurality of pairs of bus bars, a first and a second set of secondary windings, the secondary windings of said sets being connected in series, respectively, to the bus bars of said pairs, and the number and polarity of each secondary winding being proportional to sin $\phi_n$ and cos $\phi_n$, respectively, where $\phi$ is the phase of the signal voltage at the associated transducer with respect to the phase of the signal voltage of a reference tranducer in said array for a given azimuth signal source direction,
a plurality of bandpass filters with center frequencies, respectively, uniformly distributed throughout said broadband, and
means for selectively indicating the voltage at the output of said filters and identifying distinctive voltages in terms of beam direction.

4. In the combination defined in claim 3, the number of turns of said secondary windings each being increased or decreased to minimize side lobes on either side of each beam.

No references cited.

CHESTER L. JUSTUS, *Primay Examiner.*

R. A. FARLEY, *Assistant Examiner.*